United States Patent [19]

Breitscheidel et al.

[11] Patent Number: 5,051,293
[45] Date of Patent: Sep. 24, 1991

[54] FOLDABLE FOAM MAT

[75] Inventors: Hans-Ulrich Breitscheidel, Siegburg; Rudolf Kautz, Hennef, both of Fed. Rep. of Germany

[73] Assignee: Huels Troisdorf AG, Troisdorf, Fed. Rep. of Germany

[21] Appl. No.: 642,608

[22] Filed: Jan. 17, 1991

[51] Int. Cl.⁵ .............................................. B32B 3/26
[52] U.S. Cl. .................... 428/157; 428/121; 428/130; 428/159; 428/167; 428/181; 428/215; 428/319.3
[58] Field of Search ............... 428/121, 130, 157, 159, 428/160, 167, 181, 182, 213, 215, 319.3

[56] References Cited

U.S. PATENT DOCUMENTS 3,192,099 6/1965 Beckman et al. .................. 428/182
3,222,437 12/1965 Schilling ............................. 428/159
4,882,208 11/1989 Breitscheidel et al. ........... 428/314.4

FOREIGN PATENT DOCUMENTS 1361501 7/1974 United Kingdom ................ 428/159

Primary Examiner—William J. Van Balen
Attorney, Agent, or Firm—Felfe & Lynch

[57] ABSTRACT

A foldable foam mat has a longitudinal fold line extending over the entire length of the foam mat and a plurality of transverse fold lines which are arranged in pairs and extend, perpendicular to the longitudinal fold line, over half of the mat toward the edges of the mat. One of each of the transverse fold lines, which are arranged in pairs, is configured as a single fold line, and one as a double fold line. Preferably, the fold lines have an asymmetric configuration, referring to the cross section of the foam mat.

4 Claims, 2 Drawing Sheets

FOLDABLE FOAM MAT

FIELD OF THE INVENTION

This invention relates to a novel foldable foam mat which comprises a plurality of single and double fold lines which enable the mat to be folded longitudinally as well as transversely.

BACKGROUND OF THE INVENTION

A foldable foam mat which has proven itself in practice is disclosed in West German Patent No. 35 24 574. However, a disadvantage of this known foldable mat is that after it has been folded the mat still has relatively large dimensions because it can be folded only about transverse fold lines. The mat has hinge-like single or double fold lines about which the individual panels of the mat can be folded.

OBJECTS OF THE INVENTION

It is an object of the present invention to provide a foldable foam mat which can be folded to form a package which is sufficiently small to be stowed in a backpack, for example.

Other objects and advantages of the present invention will become apparent as the description thereof proceeds.

DESCRIPTION OF THE INVENTION

The above object is achieved in accordance with the present invention by a foam mat which has a longitudinal fold line extending over the entire length of the mat as well as a plurality of transverse fold lines. The latter are associated with each other in pairs and extend perpendicularly from the longitudinal fold line over half of the mat width to the two edges of the mat. One of the paired transverse fold lines is configured as a fold line with a small bending radius, and the other is configured as a fold line with a larger bending radius. When the foam mat is folded once about the axis of the longitudinal hinge-like fold line, a fold line with a larger bending radius on one half of the mat comes to rest on a fold line with a smaller bending radius on the other half of the mat.

In accordance with the present invention, the single fold lines are used as fold lines with the smaller bending radius, and the double fold lines are used as fold lines with a larger bending radius.

After the foam mat is folded about the axis of the longitudinal hinge fold line, the single-folded foam mat can be further folded in accordion-like manner several times in a transverse direction about the axes of the single and double fold lines that are on top of each other.

For this purpose it is necessary that the material of the foam mat exhibit a certain elasticity, since the arrangement of the fold lines in accordance with the invention requires that the material, especially at the intersecting portions of the longitudinal and transverse fold lines, be slightly compressed and/or stretched.

Advantageously, the fold lines have an asymmetric configuration with reference to the cross section of the foam mat, so that the axes of the individual fold lines run approximately alongside one of the two mat surfaces. Specifically, this feature is accomplished with the aid of a groove produced in the foam material by a unilateral compression to a width of about 1 to 4 mm, the groove having corresponding dimensions. In order to produce a double fold line, a double groove is formed in two parallel areas, each having a width of 1 to 4 mm, spaced apart from one another at a distance corresponding to approximately 1.5 to 2.5 times the size of the mat thickness. The axes of the single folding lines are preferably located on one surface of the mat, and the axes of the hinged double folding lines are located on the respective other mat surface.

In order to obtain a uniform folding of the mat, the preferred arrangement on each half of the mat in the longitudinal direction of the foam mat is such that a single fold line is followed, always at the same distance, by a double fold line and vice-versa.

The foam mat of the present invention is preferably manufactured from a cross-linked polyethylene foam material having a raw density of 20 to 100 kg/cm$^3$, especially 30 to 70 kg/cm$^3$. The preferred thickness of the polyethylene foam material is 2.5 to 6 mm, especially 3 to 5 mm. In order to improve the surface quality of the mat and the service life of the fold lines, the polyethylene foam material is covered on both sides with a plastic foil having a thickness of 20 to 200 μm.

In order the produce the fold lines, it is advantageous to employ the process described in West German Patent No. 35 24 574. All of the fold lines can, if desired, be produced in one operating step.

BRIEF DESCRIPTION OF THE DRAWINGS

The invention will be more fully understood from the following detailed description thereof taken in conjunction with the accompanying drawings which form a part of this application and in which.

DETAILED DESCRIPTION OF THE PREFERRED EMBODIMENT

Figure 1:
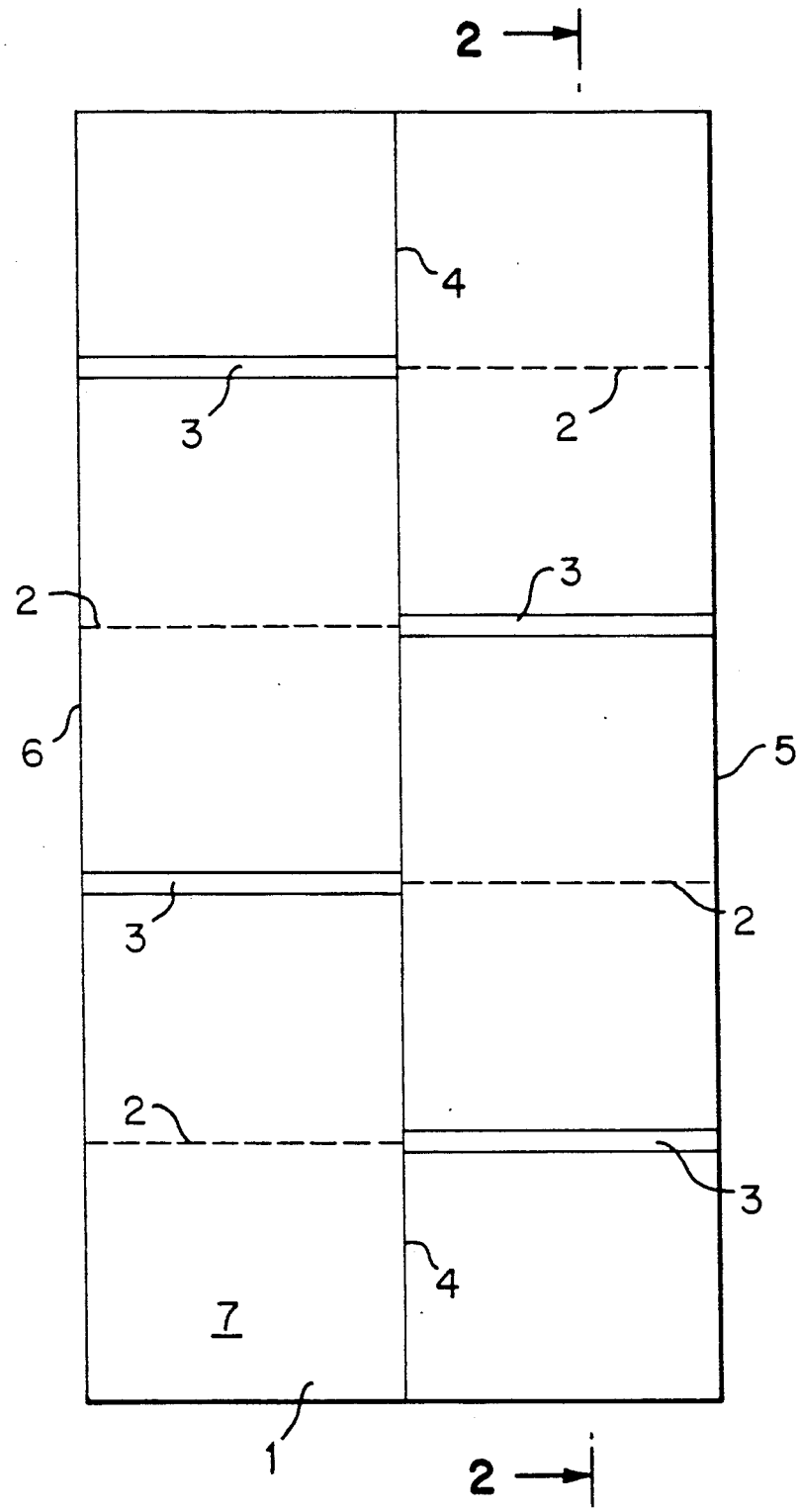
FIG. 1 is a top view of an unfolded foam mat constructed in accordance with the present invention.
Figure 2:
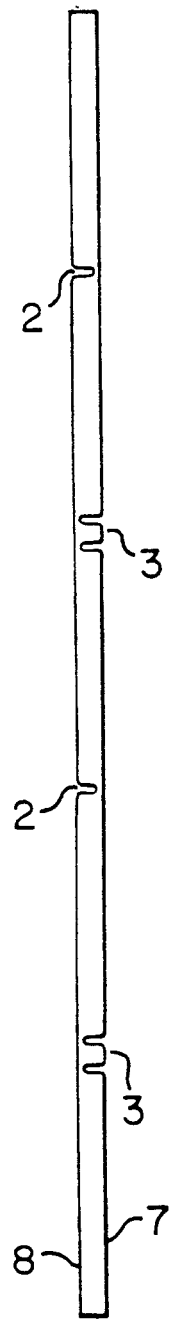
FIG. 2 is a section along line 2—2 of FIG. 1.

Referring now to FIGS. 1 and 2 a foam mat 1,900 mm long, 550 mm wide and 3.5 mm thick, made of chemically cross-linked polyethylene foam material having a raw density of 50 kg/cm$^3$ (TROCELLEN ®5003,5) is covered on both sides with a non-crosslinked polyethylene film of 80 μm thickness and provided with fold lines 2, 3 and 4. A process suitable for this purpose is described in West German Patent No. 35 24 574. On the top 7 of foam mat 1, a continuous groove 1.5 mm wide and about 3.3 mm deep is first stamped in to provide the longitudinal fold line 4. The hinge remaining at this position is an elastic strip 0.2 mm thick and 1.5 mm wide of low bending rigidity consisting of an almost compact, unfoamed material.

Starting from the longitudinal fold line 4, four transverse double fold lines 3 extending at right angles from the longitudinal fold line 4 to the mat edges 5 and 6 are embossed into the upper side of the mat. Each of the double fold lines 3 comprises two parallel grooves spaced apart from each other at a distance of 7 mm, each groove having a width of 1.5 mm and a depth of 3.3 mm. The bottom 8 of the mat is provided with corresponding single fold lines 2 having a depth of 3.3 mm and a width of 1.5 mm. The asymmetric single and double fold lines 2 and 3 are spaced apart at a distance of 380 mm.

FIG. 2 illustrates the folding of the foam mat 1 in greater detail. First, the mat is folded once about the axis of the longitudinal fold line 4. The thickness of the mat then amounts to approximately 7 mm. Thereafter, the folding of the longitudinally folded mat is continued in an accordion-like manner with each of the single fold lines 2 forming the internal bending zone and each of the double fold lines 3 forming the external bending zone (FIG. 5).

Figure 3:
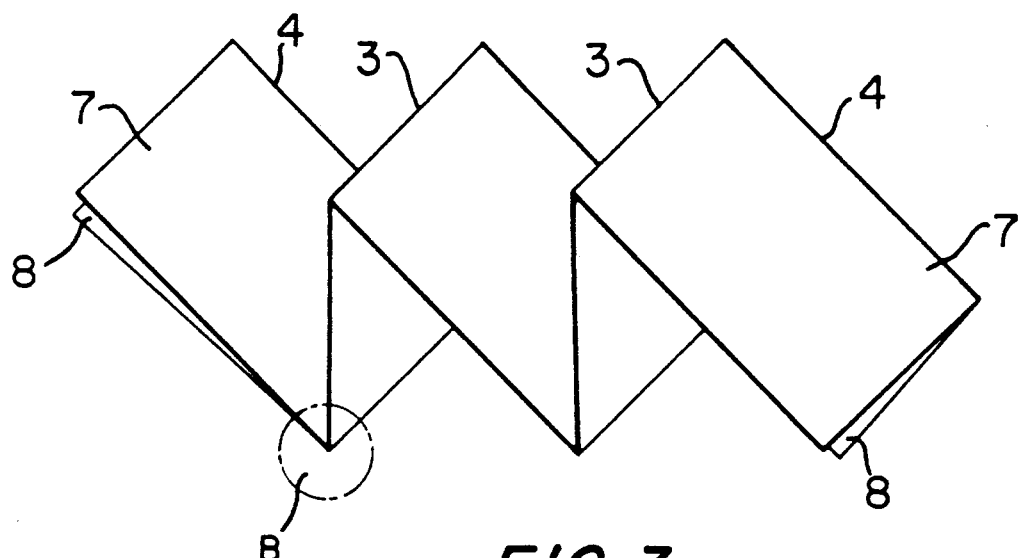
FIG. 3 is a perspective view of a longitudinally folded foam mat being folded about the transverse fold lines.
Figure 4:
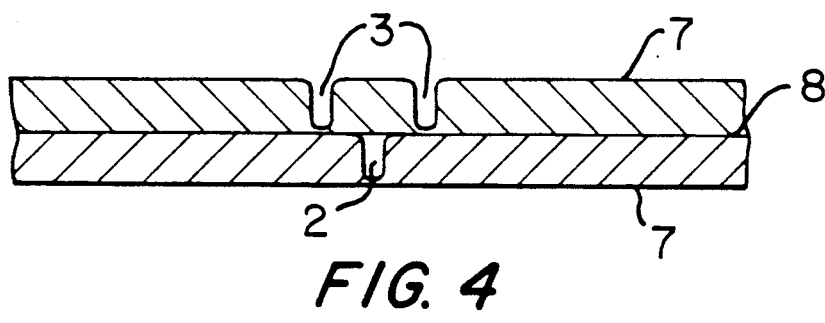
FIG. 4 is a cross section of detail B in FIG. 3 before folding of the mat.
Figure 5:
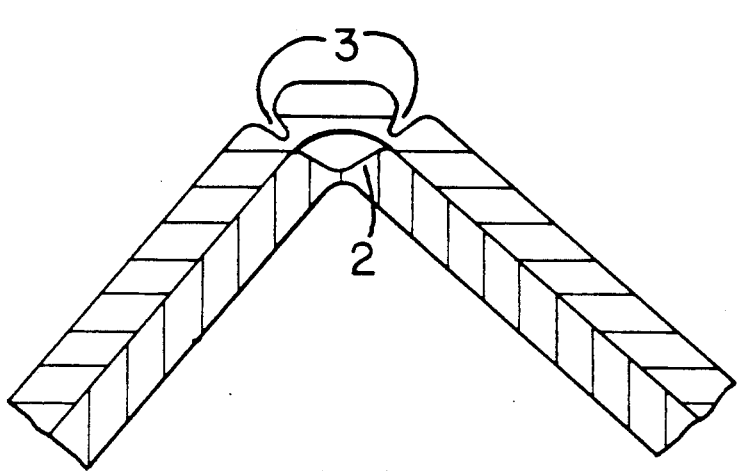
FIG. 5 is a cross section of detail B of FIG. 3 during folding of the mat.
Figure 6:
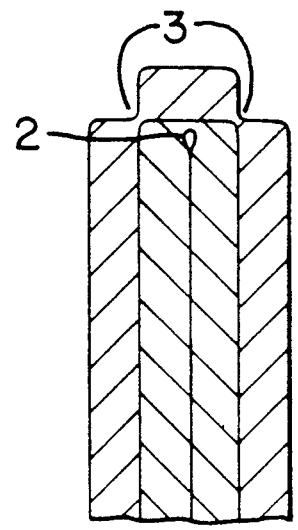
FIG. 6 is a cross section of detail B in FIG. 3 after folding of the mat.

From FIGS. 4 to 6 (detail B of FIG. 3), it can be seen that in the area of the transverse folds the parts of the mat which form the external bending zones are slightly stretched, and the parts of the mat which form the internal bending zones are slightly compressed. Due to the elastic foam material which is used, these compressions and/or stretchings produce only minor restoring forces.

The completely folded mat, which is 380 mm long, 275 mm wide and 35 mm thick, is of a practical size and can be stowed in a backpack, for example.

It is also possible to produce a corresponding foam mat with other folding dimensions, for example with a quadruple folding (fold lines spaced apart at 475 mm). Also, two or more fold line arrangements of different sizes, for example a quadruple and a quintuple folding, can be combined in a single foam mat.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A foldable foam mat (1) having several single or double fold lines, comprising a longitudinal fold line (4) extending over the entire length of the foam mat (I), and a plurality of transverse fold lines (2,3) arranged in pairs and extending perpendicularly from the longitudinal fold line (4) over one half of the mat to the two edges (5,6) of the mat, wherein one of each of the transverse fold lines (2,3) is configured as a single fold line (2) and one as a double fold line (3).

2. A foldable foam mat of claim 1, wherein the transverse fold lines (2,3) have an asymmetric configuration with reference to the cross section of the foam mat.

3. A foldable foam mat of claim 1, wherein on each half of the mat, in the longitudinal direction of the foam mat (1), each single fold line (2) is followed by a double fold line (3) and vice versa, the fold lines (2,3) always being spaced apart at the same distances.

4. A foldable foam mat of claim 1, wherein the foldable foam mat (1) made of a cross-linked polyethylene foam is covered on both sides by a plastic film having a thickness of 20 to 200 μm, and has a raw density of 230 to 100 kg/cm$^3$, and a thickness of 2.5 to 6 mm, is manufactured by permanent compression of the foam material in the area of the fold lines.

* * * * *

UNITED STATES PATENT AND TRADEMARK OFFICE
CERTIFICATE OF CORRECTION

PATENT NO. : 5,051,293

DATED : September 24, 1991

INVENTOR(S) : Hans-Ulrich Breitscheidel et al

It is certified that error appears in the above-identified patent and that said Letters Patent is hereby corrected as shown below:

Column 3, line 7, "2" should read --3--.

Signed and Sealed this

Ninth Day of March, 1993

*Attest:*

STEPHEN G. KUNIN

*Attesting Officer*     *Acting Commissioner of Patents and Trademarks*